W. S. PETTIT.
CHURN.
APPLICATION FILED DEC. 28, 1909.

957,248.

Patented May 10, 1910.

Witnesses

Inventor
Winfield S. Pettit,
By Joshua R. H. Potts,
Attorney

UNITED STATES PATENT OFFICE.

WINFIELD S. PETTIT, OF WEST CAPE MAY, NEW JERSEY.

CHURN.

957,248.  Specification of Letters Patent.  Patented May 10, 1910.

Application filed December 28, 1909. Serial No. 535,370.

*To all whom it may concern:*

Be it known that I, WINFIELD S. PETTIT, a citizen of the United States, residing at West Cape May, in the county of Cape May and State of New Jersey, have invented certain new and useful Improvements in Churns, of which the following is a specification.

My invention relates to improvements in churns, but having for its object more particularly the mixing of butter and milk, whereby an increased quantity of butter is obtained, and its use is designed primarily for household purposes, the object being to enable the economizing of the amount of money usually spent for the family by enabling the wife to increase the volume of butter by the admixture of milk and subjecting the same to the churning operation of my improved device.

A further object is to provide improvements of this character which can be cheaply manufactured and sold, and can be readily used by anyone of average intelligence.

With these and other objects in view, the invention consists in certain novel features of construction and combinations and arrangements of parts, as will be more fully hereinafter described and pointed out in the claims.

Figure 1:
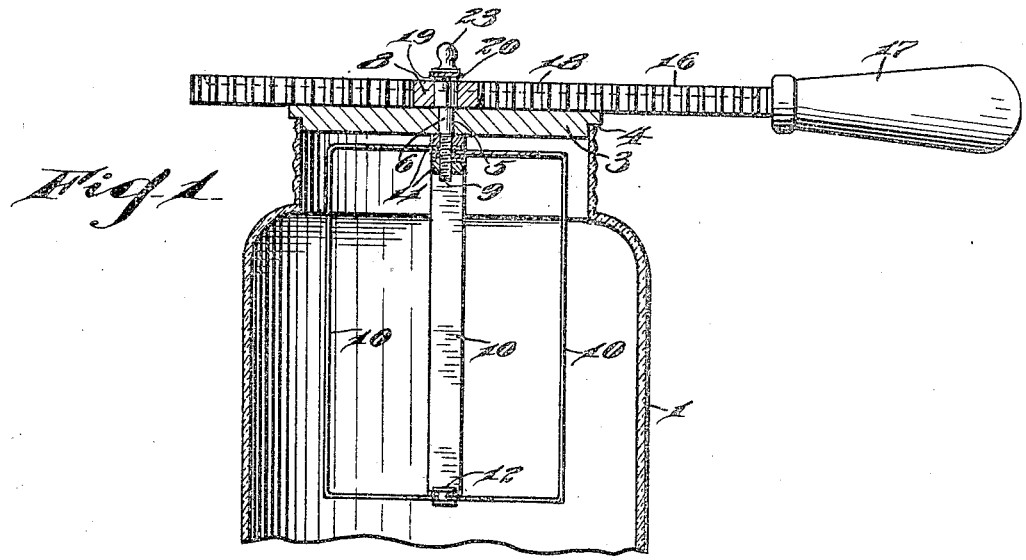
Figure 2:
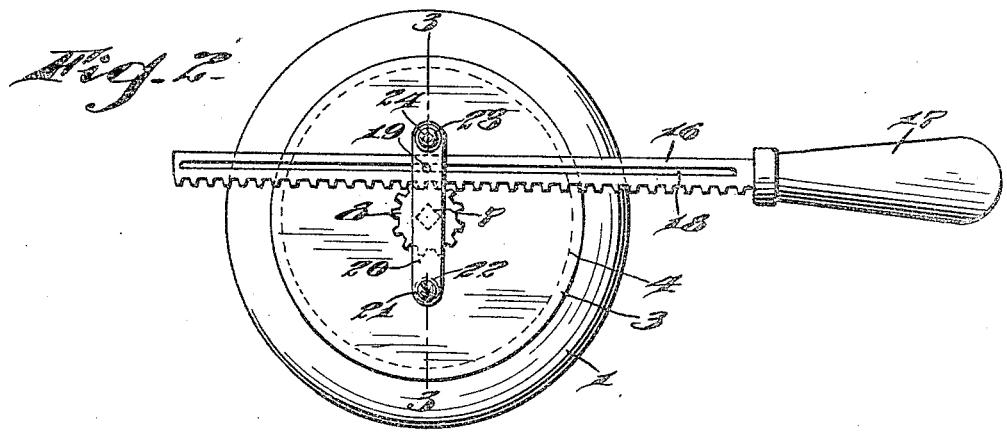
Figure 3:
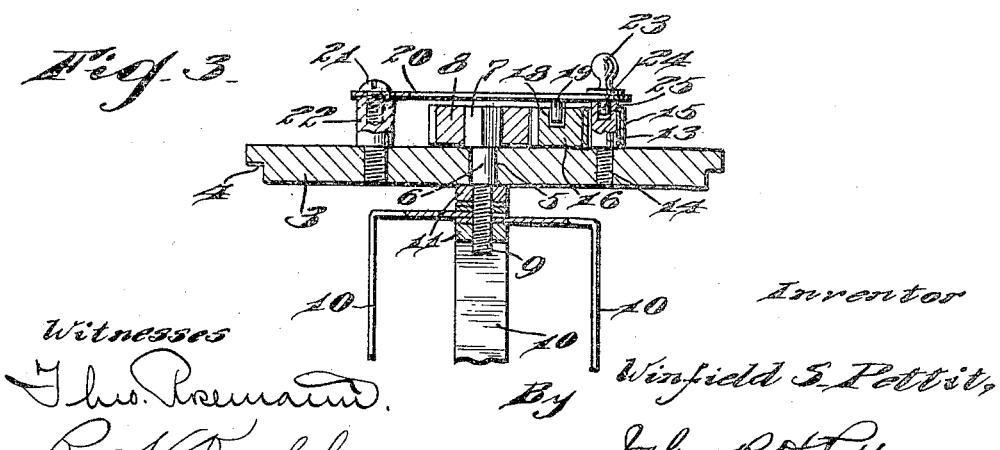

In the accompanying drawings: Figure 1 is a view in vertical position illustrating my improvements in position on an ordinary preserving jar. Fig. 2 is a top plan view, and Fig. 3 is an enlarged view in cross section on the line 3—3 of Fig. 2.

1 represents an ordinary preserving jar and 3 a circular disk which forms a part of my improved device and is provided with an annular groove 4, so as to enable the disk 3 to seat within the neck of the jar 1 and form a tight closure on the jar. This disk 3 is provided with a central opening 5 in which a journal 6 is mounted to turn, the upper end of said journal being made angular as shown at 7 to key a pinion 8 thereto, so that when the pinion 8 turns, the journal 6 will turn, the angular portion 7 being of greater diameter than the normal diameter of the journal, forms an annular shoulder on top of the disk 3 which prevents longitudinal movement of the journal.

The lower end of the journal is screw threaded as shown at 9, and 10, 10, represent rectangular dashers. These dashers are preferably of sheet metal bent at four points, forming dashers of oblong shape disposed at right angles to each other, the four ends of the two dashers being perforated and positioned on the screw threaded portion 9 of journal 6 between nuts 11 screwed on to the journal, and when these nuts 11 are screwed toward each other, they effectively clamp the upper ends of the dashers and lock them to turn with the journal. The lower ends of the dashers, where they cross each other, are secured together by means of a rivet 12, and I preferably make one of these dashers smaller in diameter than the other; one dasher being shown in Fig. 1, while the other appears in Fig. 3 in edge view. By this arrangement, the dashers in turning, will move through different arcs of circles so as to more thoroughly agitate the contents of the jar.

A journal pin 13 provided with a screw threaded end 14, is screwed into the disk 3 at a point removed from journal 6, and a roller 15 is mounted on this journal 13.

16 represents a toothed rack bar having a handle 17 at one end. This rack bar is positioned between the roller 15 and the pinion 8, the teeth of the rack bar being in mesh with the teeth of the pinion so that when the rack bar is reciprocated, the pinion will be revolved and the dashers will be revolved within the jar. In order to provide a uniform engagement between the rack bar and the pinion, the rack bar is provided with a longitudinal groove 18 in its upper face, into which a pin 19 on a spring bar 20 is adapted to be positioned, and is normally positioned during the operation of the device. This spring bar is pivotally connected at one end by means of a screw 21 which is positioned through an opening in the spring bar and screwed into a threaded socket in a stud 22 on a disk 3, and the free end of the spring bar is provided with a knob 23 on its outer face and a stud 24 on its inner face adapted to enter a socket 25 in the upper end of journal pin 13, so that by grasping the knob 23 the spring may be elevated so as to bring the pin 19 out of the groove 16 and the stud 24 out of the socket 25, and enable the spring bar to be swung out of the way so that the rack bar may be removed when desired for packing or shipping, so as to economize space, but when once in position as shown in Fig. 3, the pin 19 serves to insure a uniform engagement between the teeth of the rack bar and the teeth of the pinion, preventing a careless operator from forcing the teeth too tight together to the damage of the device.

One operation of the apparatus is as follows: A pint of milk, for example, is placed in the jar or receptacle 1 and a pound of butter cut up in small pieces is deposited in the milk. My attachment is then placed on the jar with the dashers 10 projecting into the milk, and when the rack bar 16 is reciprocated for a few moments, it will be found that the butter and the milk have so commingled that a quantity of butter will be formed equal to practically twice the amount of butter that has been deposited in the milk, and this butter will be found to be satisfactory for all household uses and will result in a great economy to all. While this is one way that the device may be operated, I do not, of course, limit myself to any particular operation, but consider myself at liberty to use the improvement for any use to which it may be put.

Various slight changes might be made in the general form and arrangement of parts described without departing from my invention, and hence I do not restrict myself to the precise details set forth, but consider myself at liberty to make such changes and alterations as fairly fall within the spirit and scope of the appended claims.

Having thus described my invention, what I claim as new and desire to secure by Letters Patent is:—

1. A device of the character described comprising a disk, a journal projecting through the center of the disk, dashers secured on the lower end of the journal, a pinion secured on the upper end of the journal, a journal pin projecting above the disk, a roller on said journal pin, a rack bar between said roller and said pinion and having its teeth in mesh with the teeth of the pinion, said rack bar having a longitudinal groove, a spring bar having rotary mounting at one end, a pin on said spring bar adapted to be positioned in said groove of the rack bar, said journal pin having a socket in its upper end, a stud on said spring bar adapted to enter said socket, and a knob on said spring bar.

2. A device of the character described comprising a disk adapted to serve as a cover for a receptacle, a journal supported centrally in the disk and screw threaded on its lower end, a pinion secured on the upper end of the journal, a journal pin projecting above the disk, a roller on said journal pin, a rack bar between said roller and said pinion and having its teeth in mesh with the teeth of the pinion, said rack bar having a longitudinal groove, a spring bar having rotary mounting at one end, a pin on said spring bar adapted to be positioned in said groove of the rack bar, said journal pin having a socket in its upper end, a stud on said spring bar adapted to enter said socket, and a knob on said spring bar, dashers comprising strips of metal bent into rectangular form and perforated at their ends to receive the screw threaded portion of the journal, nuts on the journal at opposite sides of the dashers clamping them to the journal, a pinion on the upper end of the journal, and a toothed rack bar in engagement with the pinion, substantially as described.

In testimony whereof I have signed my name to this specification in the presence of two subscribing witnesses.

WINFIELD S. PETTIT.

Witnesses:
 REUBEN B. REEVES,
 THOMAS F. HEMINGWAY.